United States Patent [19]

Belanger

[11] Patent Number: 4,620,805
[45] Date of Patent: Nov. 4, 1986

[54] PLASTIC BEARING AND HOUSING ASSEMBLY

[75] Inventor: James A. Belanger, Northville, Mich.

[73] Assignee: Belanger, Inc., Northville, Mich.

[21] Appl. No.: 812,415

[22] Filed: Dec. 23, 1985

Related U.S. Application Data

[63] Continuation of Ser. No. 612,306, May 21, 1984.

[51] Int. Cl.[4] ............... F16C 23/02; F16C 33/22; F16C 35/02
[52] U.S. Cl. ................... 384/297; 384/257; 384/276; 384/428; 384/908
[58] Field of Search ........... 384/125, 129, 215, 220, 384/222, 247, 252, 256, 257, 261, 275, 276, 295, 428–444, 296, 297, 298, 299, 300, 416, 417, 418, 419, 907, 909; 308/4 R, 4 C, 245, DIG. 3, DIG. 7

[56] References Cited

U.S. PATENT DOCUMENTS

| | | |
|---|---|---|
| 2,211,295 | 8/1940 | Searles et al. . |
| 2,251,228 | 1/1941 | Leister . |
| 2,631,069 | 3/1953 | Starr . |
| 3,428,372 | 2/1969 | Keller et al. . |
| 3,771,846 | 11/1973 | Bass et al. . |
| 3,942,314 | 3/1976 | Olowinski . |
| 4,026,611 | 5/1977 | Stanwell-Smith et al. . |
| 4,047,771 | 9/1977 | Vaughn et al. . |
| 4,057,866 | 11/1977 | Belanger . |
| 4,096,600 | 6/1978 | Belanger . |
| 4,135,773 | 1/1979 | Van Remoortel .................. 384/125 |
| 4,382,598 | 5/1983 | McCloud . |

FOREIGN PATENT DOCUMENTS

| | | |
|---|---|---|
| 2632990 | 11/1977 | Fed. Rep. of Germany . |
| 2809438 | 9/1979 | Fed. Rep. of Germany . |
| 12961 | 4/1972 | Japan . |
| 775212 | 5/1957 | United Kingdom . |

OTHER PUBLICATIONS

Packing instructions entitled "Sealmaster Ball Bearings", (two sides), SealMaster Bearings Morse Chain Division, Borg-Warner Corporation, Aurora, Ill. 60507, no date.
"Gar-Dur" R Plastic Gains Wide Acceptance in Hydro-electric Industry", (two sides), Garland Mfg. Co., P.O. Box 71, Saco, ME/USA 04072, Electrical World, Jul. 1981.
"Gar-Dur" R Plastic Wheels Keep Fords Rolling", (two sides), Garland Mfg. Co., P.O. Box 71, Saco, ME/USA 04072, Automotive News, Jan. 25, 1982, More Info Bulletin #179.
"Gar-Dur" R Plastic Conveys Improved Cost Performance on Automotive Assembly Lines", (one side), Garland Mfg. Company, P.O. Box 71, Saco, ME/USA 04072, More Info Bulletin #982.

Primary Examiner—Stuart S. Levy
Assistant Examiner—Thomas R. Hannon
Attorney, Agent, or Firm—Cullen, Sloman, Cantor, Grauer, Scott & Rutherford

[57] ABSTRACT

A bearing assembly having two part housing and a block of plastic material defining a bearing surface in a bore. The two part housing when secured together defines an interior cavity which receives the block. The housing has at least one opening in either or both parts through which a shaft may be extended. The shaft also extends into the bore in the block where it contacts the bearing surfaces. The housing includes plural fastener bores circumferentially spaced from each other and disposed about the interior cavity. Fasteners inserted through the fastener bores act to retain and surround the block.

2 Claims, 12 Drawing Figures

PLASTIC BEARING AND HOUSING ASSEMBLY

This application is a continuation of my U.S. patent application, Ser. No. 612,306, filed May 21, 1984.

BACKGROUND OF THE INVENTION

The present invention relates to a method of making solid plastic bearings and the bearings made thereby which are especially useful in apparatus for washing vehicles.

It is long been a problem keeping bearings used in a moist, water sprayed environment properly maintained and operational. Prior art bearings are generally fabricated from metal and include balls or rollers that must be lubricated to minimize rust, friction and wear. When such bearings are used in a moist environment they must be sealed to prevent water from causing the bearing parts to rust and/or freeze-up.

Car wash equipment places extraordinary demands upon bearings because they are constantly exposed to spraying water and detergent which quickly destroys the lubrication in a bearing if the bearing seal fails. As a result, bearings on car wash equipment must be frequently lubricated and/or replaced to keep the equipment functioning properly. The maintenance is both time consuming and expensive in both manhours and the cost of replacing the bearings. When the bearings are lubricated, grease or oil may be deposited on the strips of finishing material which actually wash, dry, and buff the vehicles. Oil or grease on the finishing material can adversely effect the quality of the wash and may even require the replacement of finishing material.

If a bearing on a critical part of the car wash equipment freezes up, the entire operation may be stopped until the frozen bearing is replaced. If a car wash operation must be stopped on a busy day considerable revenues can be lost.

In car wash equipment shafts frequently move within bearings with an arcuate motion. Such an arcuate motion causes the shaft to bear against a limited portion of the bearing resulting in an uneven bearing surface wear. With ball or roller bearings only a portion of the balls or bearings may actually be subjected to wear. There is no effective way of shifting and holding the bearing elements in a different position to permit other portions of the bearing to wear and extend the useful life of the bearings beacause the balls or rollers normally revert to their original, worn position.

Segmented high molecular weight plastic bearings are known to be used in hydroelectric power generators. The segmented bearings are formed in quarter sections and are attached to a mounting surface by fasteners which extend through the segment. When the fasteners are tightened in the bearing segments they can squeeze the bearing material and in some cases cause a deformation of the bearing surface. In hydroelectric generators the slight deformation is easily wiped away by the action of the hydroelectric generator shaft due to the tremendous forces exerted thereby. However, such deformation of the bearing surface with lower power drive systems can cause the bearings to seize up or cause undue strain on the drive. In many cases the fasteners which are provided to tighten the bearing segments to a support surface become unfastened due to vibrations. This results in maintenance problems in the field.

SUMMARY OF THE INVENTION

The present invention relates to a method of making a high molecular weight plastic bearing by forming a block of high molecular weight plastic into the desired shape and forming a bearing bore in the block. The bearing is completed by attaching a rigid sleeve between the bearing surface and the fasteners used to mount the bearing on a supporting surface which permits the bearing to be securely attached to the supporting surface.

Distortion of the bearing surface causing the bearing to bind against the shaft is prevented by providing a sleeve of rigid material between the fastener and the bearing surface. The rigid sleeve is equal to or slightly longer than the thickness of the block so that the fastener may be tightened against the sleeve to the extent desired and thereby avoid surface contact between the metal fastener and the plastic bearing which causes the fastener to untighten when in use.

The rigid sleeve may be attached to the outer perimeter of the block to provide a casing which is secured to the support surface. Alternatively, a plurality of rigid sleeves may be received and retained in an interference fit within fastener bores formed in the block. In either form, the sleeves permit the fasteners to be tightened against the rigid sleeves without deforming the bearing surface and thereby insuring that the fasteners will remain tightened when the bearings are subjected to vibrations.

An advantage of one form of the invention is that bearing life may be prolonged by rotating the bearings when one portion of the bearing surface receives more wear than another portion. The bearings may be rotated by simply loosening the fasteners and rotating the bearing to a position where a new portion of the bearing surface will receive the primary wear.

The plastic bearings made in accordance with the present invention are ideal for use in a car wash apparatus since the water spray only improves bearing performance and there is no need to periodically lubricate or grease the bearings. There is no costly downtime for maintenance or for freezing up of bearings since the plastic bearings made in accordance with the present invention do not rust or freeze-up. The appearance of the bearings is uniform since no rust occurs.

These and other advantages will become apparent upon reading the following detailed description with reference to the drawings.

DETAILED DESCRIPTION

Figure 1:
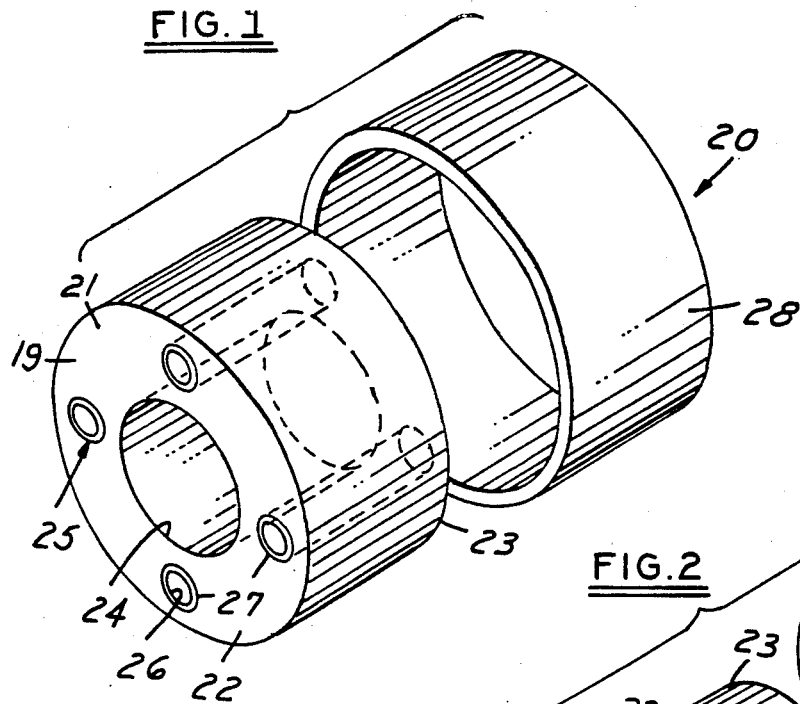
FIG. 1 is an exploded perspective view of a plastic bearing having fastener sleeves and an external sleeve or housing.

Referring now to the drawings, several different variations of a bearing 20 made in accordance with the method of the present invention are illustrated.

The method of making bearings 20 includes first forming a block of ultra high molecular weight plastic into the desired shape. A preferred type of ultra high molecular weight plastic material is sold under the trade name GarDur by Garland Manufacturing Company of Saco, Me. 04072. The block 21 has first and second opposite sides 22 and 23 and a centrally located bearing bore 24 formed in the first side 22 of the block 21 to extend toward the second side 23. The bearing bore 24 preferably extends through the block 21 and opens onto the second side 23. The block 21 has an outer periphery or zone 19 integral with and surrounding the inner zone including the bore 24. Sleeves 25 located in the outer zone 19 of the block 21 are then assembled onto the block 21 to extend from the first side 22 to the second side 23. The sleeves 25 function as rigid members through which fasteners may extend to secure the bearing 20 to a mounting surface.

As shown in FIG. 1, the rigid sleeve 25 may be a fastener sleeve 26 which is inserted into a fastener bore 27 formed therein. The fastener sleeve 26 is provided to support the bearing 20 against forces exerted upon the block 21 by a fastener as will be explained with reference to FIGS. 3 and 4. A casing or housing 28 is shown in FIG. 1 for protecting the perimeter of the block 21.

The rigid or metal sleeves 26 are pressed into the holes or bores 27 which are drilled in the block 21 during the method of making same. The plastic block 21 may also be pressed into the metal outer casing or housing 28 to prohibit cold flow or distortion. The same bore and hole drilling steps and the pressing steps for forcing the fastener sleeves 26 into the drilled holes or bores 27 of the block 21 are utilized in the various embodiments disclosed in FIGS. 1, 4, 7 and 8.

Figure 2:
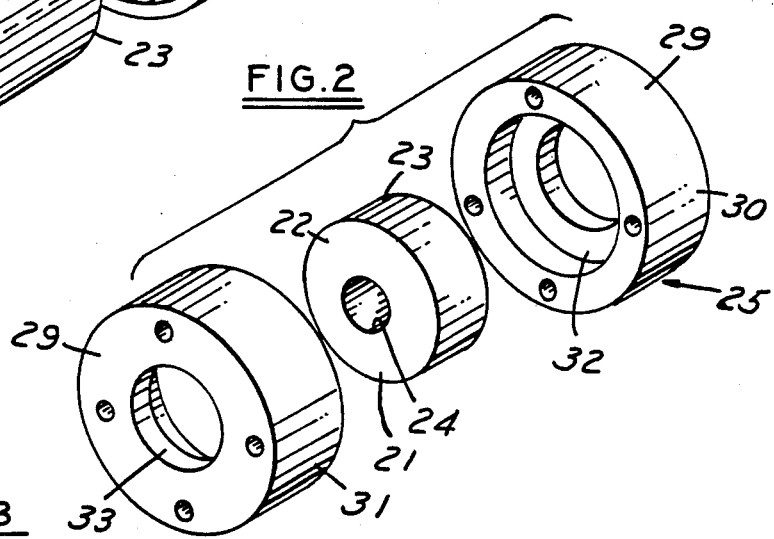
FIG. 2 is an exploded perspective view of a bearing made in accordance with the present invention having a plastic bearing insert nested within a two part bearing housing.

As shown in FIG. 2, the rigid sleeve 25 may be a perimeter sleeve or housing 29 which emcompasses the separate block 21 and is formed of a rigid material. The perimeter sleeve 29 may be formed in first and second halves or parts 30 and 31 which together define an interior cavity 32 which receives the separate block 21. A shaft opening 33 as provided in either or both of the first and second halves 30 and 31 to permit a shaft, not shown, to extend therethrough and into the bearing bore 24 provided in the block 21. The bolt holes or bores 35 are drilled in the first and second parts 30 and 31 which are made from metal. Bolts or fasteners, not shown, are inserted through the aligned bores 35 to retain and surround the plastic block 21. The drilled bores or holes 35 are also provided in the metal housing or sleeves 25 of FIGS. 5 and 6.

Figure 3:
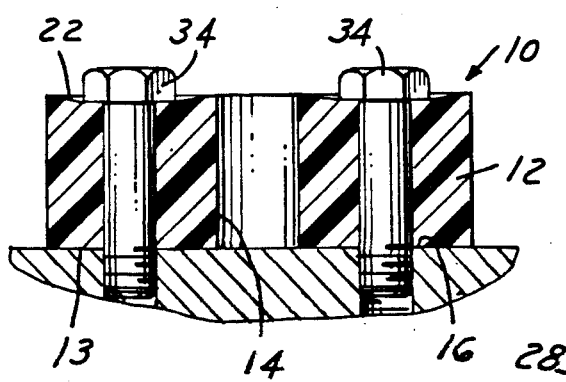
FIG. 3 is a fragmentary cross-sectional view showing a plastic bearing secured to a mounting surface by fasteners without the use of rigid sleeves.

Referring now to FIG. 3, a prior art bearing 10, not made in accordance with the present invention, is shown with fasteners 34 attaching it to a mounting surface 16. The bearing 10 includes a block 12 of ultra high molecular weight plastic which is attached on its second side 13 to the mounting surface 16. The fasteners 34 when subjected to vibrations will become loose and cannot be tightened down to hold the bearing 10 on the support. This is because the metal fastener is contacting the plastic bearing 10 and there is no way to lock the bolts or fasteners in place. In some cases the holes in the block 21, as shown in FIG. 3, may be compressed by the metal fastener 34 which causes the block 12 to become distorted or bowed. The distortion can cause inward deflection of the bearing bore 14 which in some cases can result in a shaft binding within the bearing 10. In any event the metal fastener head cannot be tightened down against the plastic bearing surface and remain tightened since vibrations will loosen same.

Figure 4:
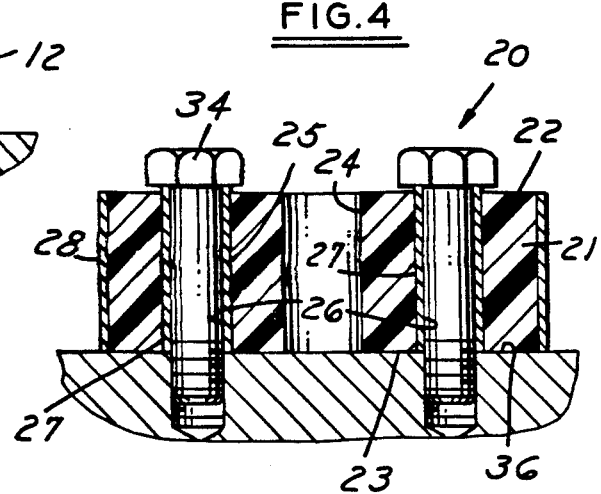
FIG. 4 is a fragmentary cross-sectional view of a bearing having rigid sleeves, as shown in FIG. 1. The fasteners contact the rigid sleeves thereby attaching the bearing to a mounting surface without the fasteners becoming untightened when subjected to vibrations.

Referring now to FIG. 4, a bearing 20 made in accordance with the present invention is shown attached to a mounting surface 36 by means of fasteners 34. The bearing 20 includes a rigid fastener sleeve 26 in each fastener bore 27. The fastener sleeve 26 provides a rigid member against which the fastener 34 may be tightened. The tightened fastener will not become loose when subjected to vibrations. Also no deformation of the block 21 or distortion of the bearing bore 24 will occur. The bearing 20 shown in FIG. 4 also includes the casing 28 which protects the outer surface of the block 21.

Figure 5:
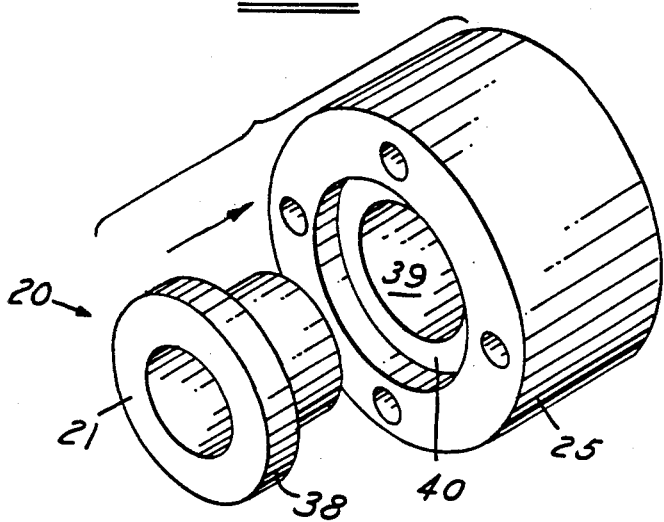
FIG. 5 is an exploded perspective view of a plastic bearing having an annular flange on one end adapted to seat within a sleeve or housing having a complementary annular recess.

Referring now to FIG. 5, a different version of the bearing 20 is shwon in which a cylindrical block 21 of ultra high molecular weight plastic also includes a flanged end 38 which is adapted to be received within a rigid metal sleeve or housing 25 having a central cylindrical opening 39 and an annular recess 40 complementary with the flanged end 38 of the block 21. In this embodiment the flanged end 38 of the block 21 prevents the block from moving axially within the rigid sleeve 25. This type of bearing 20 is preferably assembled to a mounting surface with the flanged end 38 abutting the mounting surface 36 so that the block 21 is effectively captured within the rigid sleeve 25.

Figure 6:
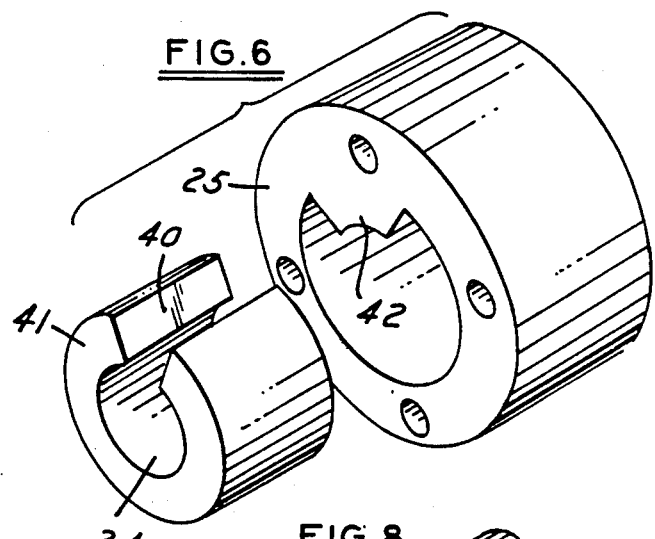
FIG. 6 is an exploded perspective view of a bearing made in accordance with the present invention having a semi-circular bearing insert and a sleeve or housing having a complementary sleeve protrusion.

Referring now to FIG. 6, another embodiment of the present invention is shown wherein a semi-circular or arcuate block 41 of ultra high molecular weight plastic is provided for assembly with the rigid sleeve or housing 25. The sleeve 25 has a complementary sleeve protrusion 42 which is received between the spaced apart ends 40 of the arcuate block 41. In this configuration, the arcuate block 41 provides a bearing surface throughout much of the bearing bore 24 but is prevented from rotating within the rigid metal sleeve 25 by the sleeve protrusion 42.

Figure 7:
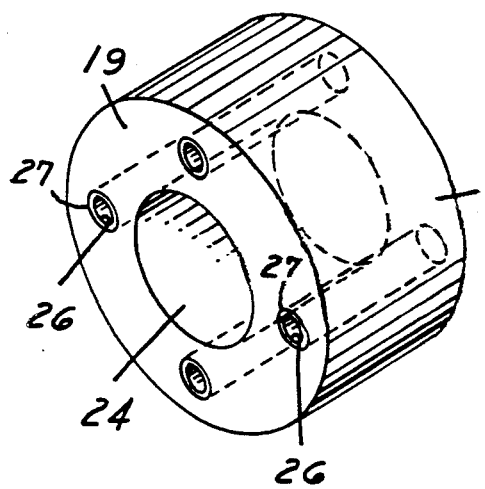
FIG. 7 is a perspective view of a cylindrically shaped bearing having fastener sleeves inserted within bores in the plastic bearing material.

Referring now to FIG. 7 a cylindrical bearing 44 also made from ultra high molecular weight plastic is shown which includes a plurality of rigid fastener sleeves 26 disposed within fastener bores 27, with each fastener sleeve 26 being equally spaced from the bearing bore 24.

The inner zone of the block is provided with the bore 24 and the concentric outer zone 19 is provided with the rigid sleeves 26 which are located on the same diameter.

Figure 8:
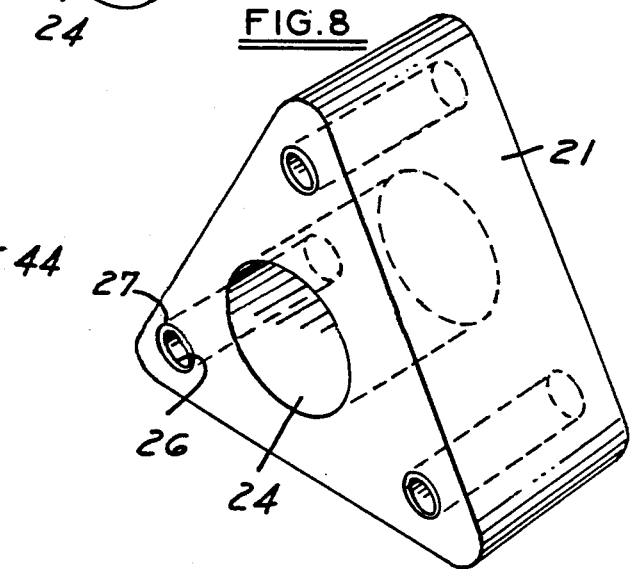
FIG. 8 is a perspective view of a triangularly shaped bearing having fastener sleeves inserted within bores in the plastic bearing material.

Referring now to FIG. 8, a triangularly shaped block 21 is shown which is formed of the high molecular weight plastic material and includes a plurality of rigid fastener sleeves 26 inserted within fastener bores 27 at a location spaced from the bearing bore 24.

Figure 9:
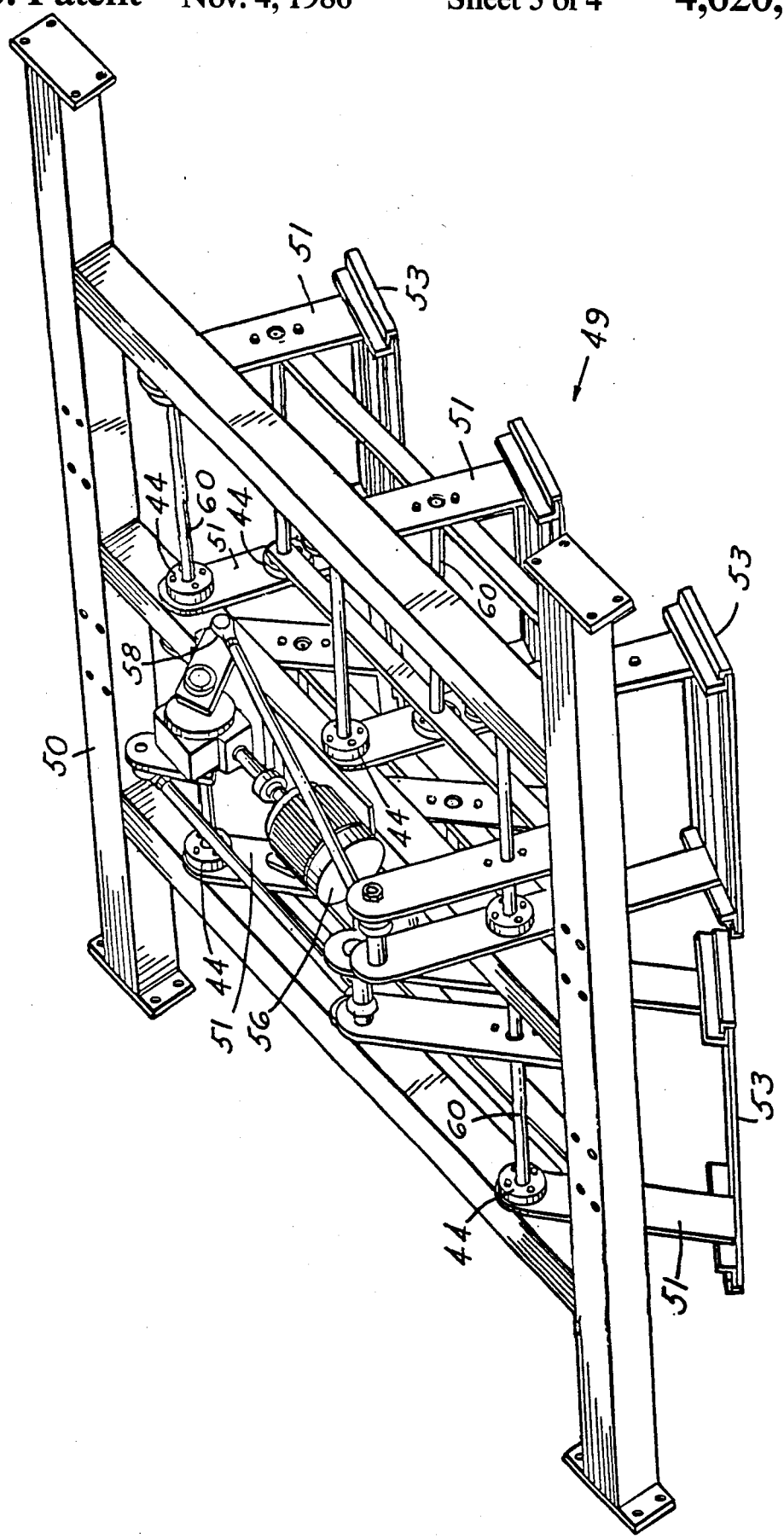
FIG. 9 is a perspective view of a portion of a vehicle wash apparatus including plastic bearings.

Referring now to FIG. 9, an apparatus 49 for washing vehicles is shown to include a frame 50 having a plurality of movable arms 51 attached thereto. The arms 51 include heads or racks 53 which are adapted to receive finishing material (not shown) which is used to wash, rinse and/or buff a vehicle as it passes thereby. The arms 51 are moved back and forth by a power means 56 which is connected to the arms 51 by suitable linkage 58.

The apparatus 49 for washing vehicles includes a pluralilty of shafts 60 which are received within bearings 44 made in accordance with the method of the present invention. The bearing 44 are of the type shown in FIG. 7 for illustration purposes. The power means 56 through the linkage 58 drives the arms 51 and thus the cloth carrying racks 53 in a back and forth swinging motion as is well-known in the art.

Figure 10:
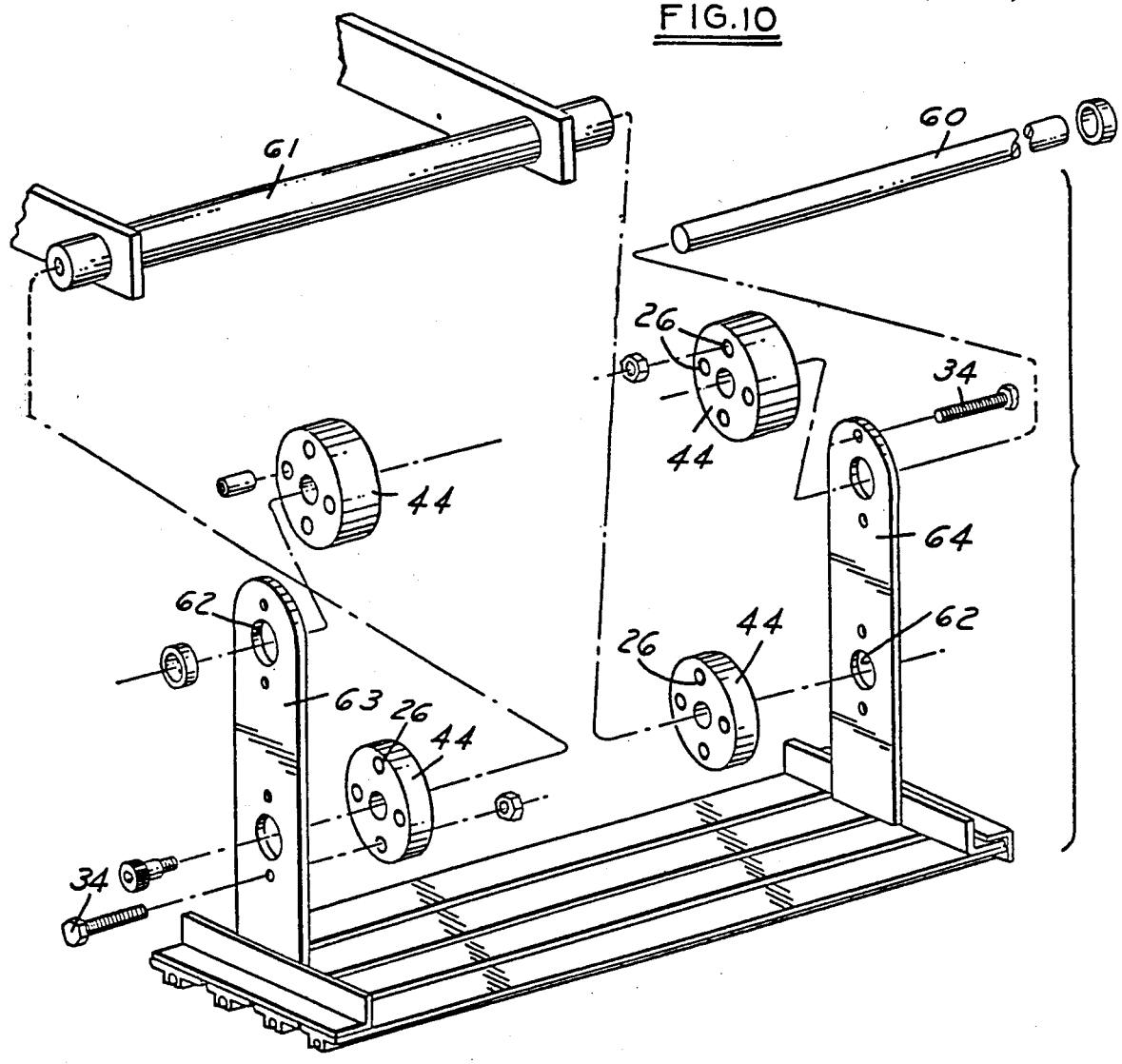
FIG. 10 is an exploded perspective view of one arm of the vehicle wash apparatus of FIG. 9.

Assembly of the bearings 44 to the arms and shaft may be better understood by reference to FIG. 10. In FIG. 10, one arm assembly has been exploded to permit examination of the asssembly of the bearings 44 to the arm 51. An upper shaft 60 is journalled within openings 62 formed on the upper ends of first and second plates or arms 63 and 64. Cylindrical bearings 44 are attached to the first and second arms 63 and 64 to support opposite ends of the upper shaft 60. The bearings 44 include rigid fastener sleeves 26 through which fasteners 34 are inserted to secure the bearings 44 to the first and second arms 63 and 64. The lowe shaft 61 is similarly inserted in openings 62 formed in the first and second arms 63 and 64 and is journalled for rotation in the cylindrical bearings 44.

Figure 11:
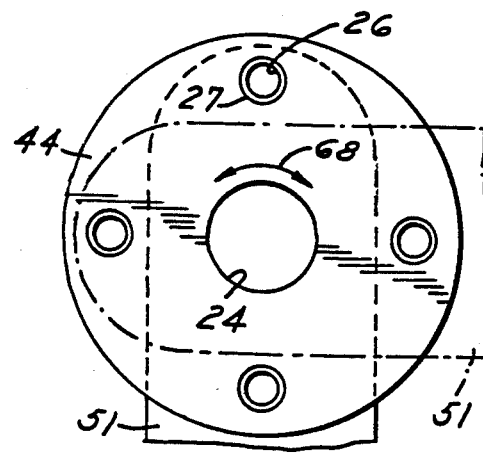
FIG. 11 is a side elevational view of an arm and shaft inserted within a bearing made in accordance with the present invention.

Referring now to FIG. 11, the wear pattern normally encountered in apparatus 49 for washing vehicles is shown in schematic form. The normal motion of the arms 51 of the car wash apparatus 49 shown in FIG. 9 is a back and forth motion resulting in an arcuate wear surface 68 being established on the bearings 44. A unique advantage of the bearings of the present invention is the ability to rotate the bearings when a wear surface 68 becomes pronounced to permit a different portion of the bearing bore to receive the primary wear. The rigid fastener sleeves 26 are located symmetrically relative to teach other and the bearing bore, for example, the illustrated bearing may be rotated in 90° increments to spread the wear about the bearing bore 24. If a triangular bearing is used as shown in FIG. 8, rotation in 120° increments may be accommodated. Such adjustments heretofore have not been possible with roller bearings or ball bearings since the worn balls or rollers of the bearings tend to return to the same position.

Figure 12:
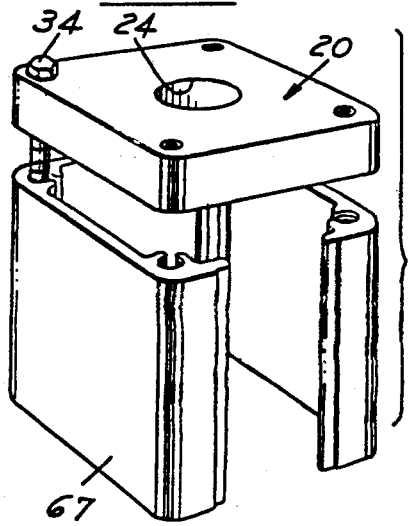
FIG. 12 is an exploded perspective view of a bearing and support block made in accordance with the present invention.

Referring now to FIG. 12, a bearing 20 is shown attached to the end of a similarly shaped tubular housing or support 67. This embodiment is especially useful in retrofit applications wherein a high molecular weight plastic bearing is desired to be substituted for a larger ball or roller bearing assembly. The support 67 acts as a spacer to properly locate the bearing 20 to receive a shaft.

The simple and effective method of making a bearing according to the present invention comprises forming a block of high molecular weight plastic material in the desired shape. Then the cylindrical bearing bore is formed in the block to extend from a first side of the block to a second side and thereafter attaching one or more sleeves to the block which extend from the first side of the block to the second side of the block to permit the bearing to be attached to a mounting surface by means of fasteners which remain tight and without deforming or distorting the block of high or ultra high molecular weight plastic and possibly causing a pinching action within the bore.

Various bearings disclosed and claimed in this application have advantages over prior art constructions. The plastic bearings are easy to machine and are maintenance free in that no grease or lubrication are required during the life of the bearings. The novel bearing will not seize on a shaft and has a four position mounting as described in connection with FIG. 11. The bearings further permit the weight of the apparatus to be distributed over a large area thus increasing the life of the bearings. The rigid metal sleeves are preferably made from aluminum although other non-rustable rigid metals may be utilized thereby contributing to the uniform appearance. The use of the plastic material results in fewer maintenance problems since the bearings do not need to be greased or lubricated resulting in the fact that the cloth utilized by the racks will not become soiled with grease. Another feature of the present invention is that the high molecular weight plastic may be stabilized through the use of fillers such as carbon fibers, glass beads, sisal and other fillers known in the art.

It will be readily appreciated that while several embodiments of the invention are disclosed other modifications may be possible and that the steps used in making the bearings may be performed in different sequences without departing from the scope of the present invention. The preceding description should be read as being illustrative and the scope of the invention should be determined by reference to the following claims.

What is claimed is:

1. A bearing comprising:
   a block of plastic material having first and second sides and a substantially centrally located bearing bore extending from the first side through the second side;
   a housing having first and second parts, said first part including a metal cylindrical annulus having first and second axially aligned cylindrical inner surfaces, said first inner cylindrical surface extending from a first end of the first part to a intermediate point in said first part, said second cylindrical surface extending from a second side of the first part to said intermediate point in said first part and having in a diameter greater than the diameter of the first cylindrical surface, said first part having a plurality of fastener bores spaced from said first and second cylindrical surfaces and said fastener bores being circumferentially spaced about said first part, said second part having first and second axially aligned cylindrical surfaces, said first cylindrical surface extending from a first side of the second part to an intermediate point in said second part, and said second cylindrical surface extending from a second side of said second part to said intermediate point in said second part, said second cylindrical surface having a diameter greater than said first cylindrical surface and being the same diameter as said second cylindrical surface of said first part, said second part having a plurality of fastener bores spaced from said first and second cylindrical surfaces and circumferentially spaced about said first and second axially cylindrical surfaces and being adapted to be aligned with said fastener bores of said first part; and said block being generally cylindrical in shape and having an outer diameter slightly less than the diameter of said second cylindrical surfaces of said first and second parts and being adapted to be received therein when said first and second parts are secured together, whereby said block is securely retained within said first and second parts such that no fasteners are required to extend through said block.

2. The bearing of claim 1 wherein said block is surrounded by and retained by said first and second parts in the opening defined by said second cylindrical surfaces and said first cylindrical surfaces have a diameter sized to permit a shaft to extend therethrough and into the bearing bore provided in the block.

* * * * *